March 8, 1960

L. G. FISCHER 2,928,091

VOLTAGE RATIO INDICATORS

Filed April 12, 1955

INVENTOR
LAURIN G. FISCHER

BY Philip M. Bolton
ATTORNEY

March 8, 1960
L. G. FISCHER
2,928,091
VOLTAGE RATIO INDICATORS
Filed April 12, 1955
3 Sheets-Sheet 2
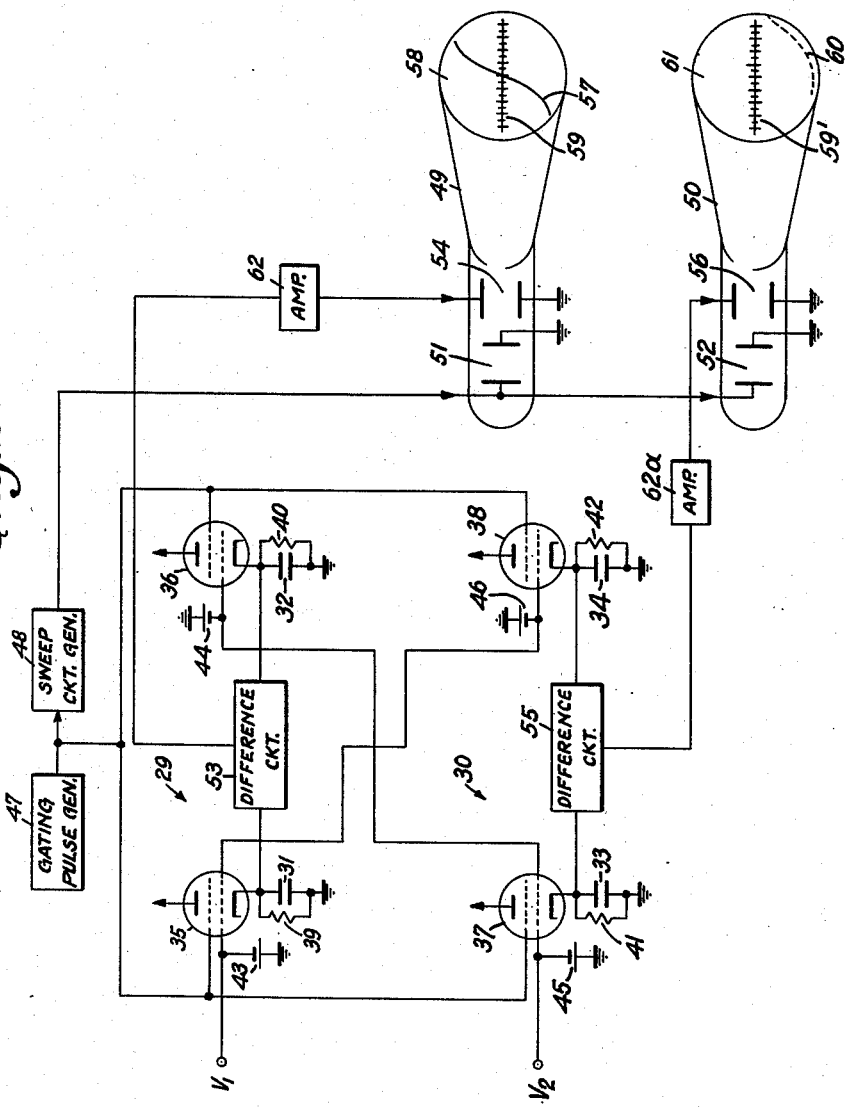
INVENTOR
LAURIN G. FISCHER
BY Philip M. Bolton
ATTORNEY March 8, 1960

L. G. FISCHER 2,928,091

VOLTAGE RATIO INDICATORS

Filed April 12, 1955

INVENTOR
LAURIN G. FISCHER
BY *Philip M. Bolton*
ATTORNEY 2,928,091

VOLTAGE RATIO INDICATORS

Laurin G. Fischer, Glen Rock, N.J., assignor to International Telephone and Telegraph Corporation, Nutley, N.J., a corporation of Maryland Application April 12, 1955, Serial No. 500,894

2 Claims. (Cl. 343—119)

The present invention relates to methods and systems for ascertaining the ratio between two voltages at any instant of time.

Devices are known for ascertaining the ratio between two voltages, such as for example ratiometers, and other ratio indicating meters particularly of the type in which opposed windings are fed with the voltages to be compared and a movable member, such as a needle, indicates the vector sum. These devices prove satisfactory where the voltages to be compared have relatively unvarying values. They are, however, slow-acting. Where the voltages involved must be sampled in periods of the order of microseconds, such devices are completely inadequate. In many systems it is required that the ratio between two voltages which can only be sampled for very short periods, of the order of microseconds, be taken at a given instant, and such voltages do not appear again. This occurs, for example, in direction finding systems in which the direction of a short non-repeated signal burst must be ascertained. Such a system is described, for example, in U.S. Patent 2,489,304, issued November 29, 1949, to N. Marchand et al. for "Direction Finder." In the system shown in said patent, the two voltages whose ratio is to be ascertained appear as visual displays on a cathode ray tube and a visual comparison must be made in order to determine this ratio. This, however, requires a certain amount of interpretation and leaves a wide margin for error.

An object of the present invention is the provision of improved methods and systems for indicating the ratio between voltages, particularly those whose durations are of the order of microseconds.

Another object of the present invention is the provision of the methods and systems such as described in the previous paragraph, which are further adapted to be used with voltages that are non-repetitive and whose ratio is to be determined at any instant.

Another object of the present invention is the provision of an improved direction finder in which directive antennas scan at least a portion of the azimuth, and the direction of a signal which may have a duration of the order of microseconds and be non-repetitive is substantially instantly determined.

In accordance with a main feature of the present invention, the voltages whose ratio is to be taken are each used to charge a storage device, such as a capacitor, to a value equal to or proportional to said voltages. If the voltages are derived from pulses, the pulses themselves may be used to control the charging of the storage devices. If the voltages are derived from more or less continuous waves, these waves may be sampled and the sampled voltages then used to control the charging of the storage devices. The storage devices are then allowed to discharge at predetermined rates, it being arranged that one of the storage devices should discharge at a different rate from the other. It will be seen that if the storage device charged to the higher voltage discharges more rapidly, at a given time after both storage devices start to discharge the voltages across the storage devices will be equal. The time between the beginning of the discharge and the instant at which the two voltages across the storage devices become equal varies according to the ratio between the two voltages originally applied to charge the storage devices. Thus, an elapsed time indicator is calibrated in terms of voltage ratio, or any other suitable calibration depending upon the system employed, and a direct reading is obtained based on the voltage ratio.

In accordance with another feature of the present invention, the voltage ratio determining system is used in connection with direction finders of the type in which a multiplicity of antennas are employed with differently-oriented directive radiation (reception) patterns. The sum of the voltages received according to the pattern is compared with the sum of the received voltages each weighted according to the position of the directive pattern of its respective antenna with reference to the directive patterns of the other antennas, the ratio of these two sums indicating the azimuth of the signal source with continuous interpolation among the variously-oriented antenna patterns.

Other and further objects of the present invention will become apparent, and the foregoing will be better understood with reference to the following description of embodiments thereof, reference being had to the drawings, in which:

Fig. 2 is a schematic and block diagram of a modified form of voltage ratio indicator particularly adapted for non-repetitive signals of short duration;

Figure 1:
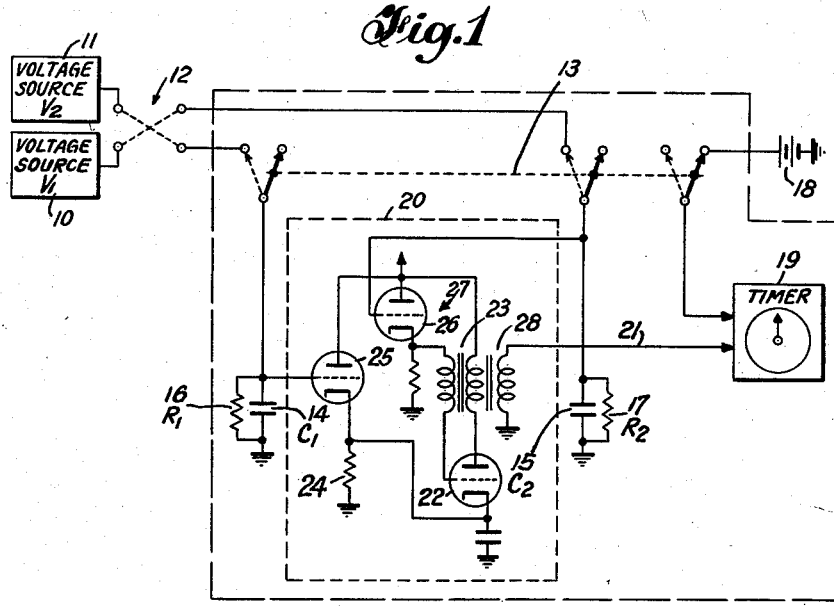
Fig. 1 is a schematic and block diagram of a voltage ratio indicator according to the present invention.
Figure 4B:
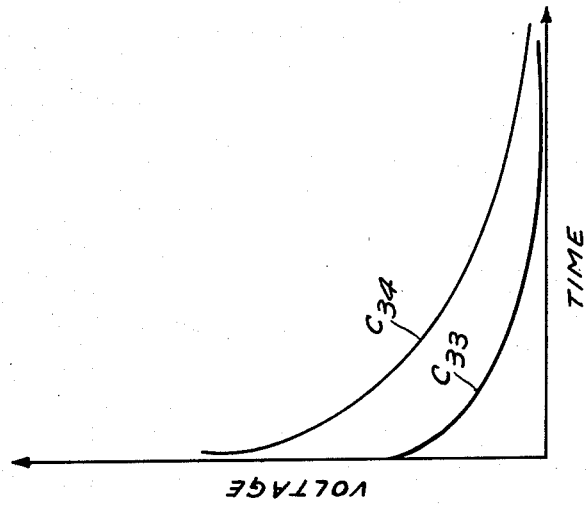
Figs. 4A and 4B are sets of curves used in explaining the present invention.
Figure 4A:
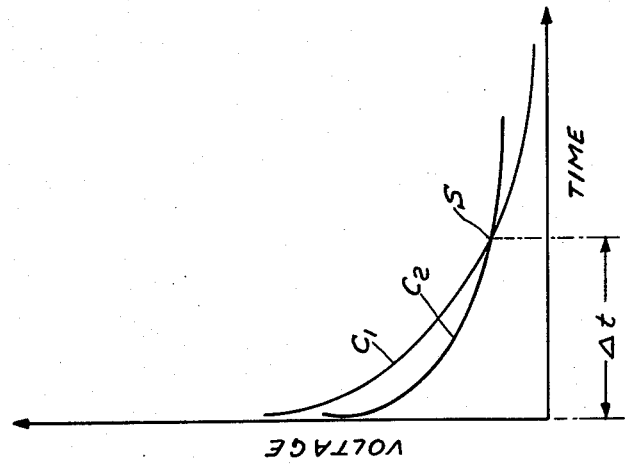

Referring now to Fig. 1, the ratio between two voltages $V_1$ and $V_2$ from any source 10 and 11, respectively, is to be measured. If the voltages are not in pulse form, then the waveform from sources 10 and 11 must first be sampled. For this purpose the sources 10 and 11 are connected through a double pole double throw reversing-switch 12 to a triple pole double throw switch 13. At the instant when it is desired to ascertain the ratio between the two voltages the switch 13 is swung into the position shown in dotted lines in Fig. 1. Voltages $V_1$ and $V_2$ are then connected so that they charge condensers 14 and 15 up to said voltages $V_1$ and $V_2$ after which the switch 13 is then swung into the positions shown in full lines in Fig. 1. In this position condensers 14 and 15 no longer are charging, but instead are arranged to discharge through respective resistors 16 and 17. When switch 13 is thrown into the position shown in full lines, a voltage from a source 18 is connected through one pole of the switch to intiate operation of a timer 19. The RC or time constant of one of the condenser discharge circuits is less than the other, it being intended that the one with the smaller time constant be that of the condenser charged to the higher voltage. Thus, assuming for example that voltage $V_1$ is greater than $V_2$, then the time constant of the discharge circuit of condenser 15 is greater than the time constant of the discharge circuit of condenser 14.. Under such conditions it will be apparent that the instantaneous voltage $e_1$ across condenser 15 will drop more rapidly than the instantaneous voltage $e_2$ across condenser 14 and that at a given crossover point the voltages will be equal This is illustrated in Fig. 4A. At this crossover point S the timer 19 is stopped and the elapsed time between the start of the discharge period and the crossover point, $\Delta t$, is an indication of the ratio between the two voltages. To detect the crossover, a voltage comparator 20 is connected between condensers $C_1$ and $C_2$, and when said two voltages are equal an output is produced which is applied via line 21 to timer 19 to stop its operation.

That the crossover time is a function of the potentials to which the condensers are charged can readily be shown. For the purpose of this argument, let condensers 14 and 15 be designated as $C_1$ and $C_2$, respectively, resistors 16 and 17 as $R_1$ and $R_2$, respectively, with $V_1$ and $V_2$ being the voltages to which $C_1$ and $C_2$ are respectively charged. The instantaneous potentials across these condensers will be determined by the exponential decay relations $$e_1 = V_1 \epsilon^{-\frac{t}{R_1 C}}$$

and $$e_2 = V_2 \epsilon^{-\frac{t}{R_2 C_2}}$$

At the instant of zero crossing $e_1 = e_2$, and $$V_1 \epsilon^{-\frac{t}{R_1 C_1}} = V_2 \epsilon^{-\frac{t}{R_2 C_2}}$$

Then $$\frac{V_1}{V_2} = \epsilon^{\left(\frac{t}{R_1 C_1} - \frac{t}{R_2 C_2}\right)} = \epsilon^{t\left(\frac{R_2 C_2 - R_1 C_1}{R_1 R_2 C_1 C_2}\right)}$$

Then $$\frac{V_1}{V_2} = \epsilon^{\alpha t}$$

where $$\alpha = \frac{R_2 C_2 - R_1 C_1}{R_1 R_2 C_1 C_2}$$

observe that if $V_1 > V_2$, $\alpha$ is positive, and $R_2 C_2 > R_1 C_1$.

From the foregoing it is evident that the time of zero crossover is a direct function of the ratio of the voltages. The foregoing is illustrated in Fig. 4A in which the declining instantaneous voltage $e_1$ is compared with the voltage $e_2$. The crossover point S occurs at a time $\Delta t$ which is a direct measure of the ratio $V_1/V_2$.

With respect to the details of Fig. 1 it will be apparent that if voltages $V_1$ and $V_2$ are more or less continuous the length of the sampling time should be short with respect to the time of variation of said voltages. It is obvious, of course, that the switch 13 could readily be replaced by electronic switching devices such as, for example, the arrangement described with respect to Fig. 2 hereinafter, particularly so when the sampling time is required to be short. It will likewise be obvious that if the voltages $V_1$ and $V_2$ are pulses whose voltage ratio is to be compared, then these pulses could be directly applied to charge the condensers without requiring any sampling movement of the switch 13. It is quite obvious also that the charging time of the condensers 14 and 15 should be sufficiently short with respect to the duration of the charging voltages so as to bring them up to the potential of said charging voltages.

With respect to the voltage comparator 20, many devices are known suitable for this purpose. A relatively simple one which depends for its operation on the fact that voltage $V_1$ is greater than $V_2$ is illustrated in Fig. 1. It will be seen that the circuit is essentially in the form of a blocking oscillator using tube 22 with a feedback transformer 23 in the plate circuit thereof. Voltage $V_1$ is applied via a cathode follower circuit 24 including a tube 25 from whose cathode a voltage is applied to the cathode of tube 22, the voltage $V_2$ blocking tube 22 preventing oscillation thereof. Voltage $V_1$ is applied through the tube 26 of a second cathode follower circuit 27 to the grid of tube 22 to initiate oscillation thereof when $V_1$ falls so that $V_2$ equals $V_1$. An output pulse is derived from the third winding 28 of the feedback transformer.

While there has been described in detail one form of voltage comparator which produces an output, it is obvious that other comparators may be used for this purpose. Furthermore, other means than those suggested by Fig. 1 may be used for indicating the elapsed time between the time when the condensers start to discharge and the time when their potentials cross-over as, for example, will be described in connection with Fig. 2. It will likewise be noted with respect to Fig. 1 that it is assumed that voltage $V_1$ will be larger than voltage $V_2$. If $V_2$ is larger than $V_1$, then the reversing switch 12 may be thrown to reverse the application of these leads so that the higher voltage will still charge the capacitor with the faster discharge time. It will likewise be apparent that instead of switching the voltages, the relative magnitudes of the capacitors and resistors $R_1 C_1$, and $R_2 C_2$ might be interchanged or varied by suitable switching means which are too obvious to require further specification. If the relative magnitude of voltages $V_1$ and $V_2$ is unknown, both positions may be tried if the voltages vary slowly enough or if the voltages are repetitive. In the case where it is not known which of the two voltages will be the larger and the rate of change is too rapid to employ the system of Fig. 1, a system such as shown in Fig. 2 may be employed.

Referring now to Fig. 2, the system shown consists generally of two voltage ratio comparator systems 29 and 30. As in the system of Fig. 1, each of the systems 29 and 30 has a pair of condensers, 31 and 32 in system 29, and 33 and 34 in system 30, which are adapted to be charged by voltages $V_1$ and $V_2$. For this purpose each of said condensers 31, 32, 33 and 34 is arranged in series with the cathode of a separate tube 35, 36, 37 and 38, respectively, the anode of each of said tubes being connected to a positive source or voltage. When said tubes conduct, they cause the charging of their associated condensers. Condensers 31—34 are discharged through suitable means such as resistors 39—42 which are respectively connected across said condensers. The voltage ratio comparing systems are arranged so that the discharge time of one RC circuit in each system is different from that of another. Thus, for example, the time constant of condenser 31 and resistor 39 in system 29, and condenser 33 and resistor 41 in system 30 may be the same as each other, but less than the time constant of condenser 32 and resistor 40 in system 29 and condenser 34 and resistor 42 in system 30, which latter are preferably equal to each other. Assuming that voltages $V_1$ and $V_2$ are not short pulses, but require sampling, then tubes 35—38 are normally biased to cut-off by any suitable means, such as by biasing batteries 43—46, respectively, which apply a negative bias to their respective grids. At the instant when a sample is to be taken, an unblocking pulse is applied from a gating pulse generator 47 to each of said tubes to unblock it and thereby cause the charging of the condensers, the unblocking time being sufficiently long to enable the condensers to be fully charged to the instantaneous magnitude of voltages $V_1$ and $V_2$ at the time of such sampling. At the end of the unblocking pulse the tubes 35—38 are again cut off and at this moment, when the condensers 31—34 start to discharge, a sweep circuit generator 48 controlled by the gating pulse generator 47 initiates simultaneous sweeps in cathode ray tubes 49 and 50, the output of the sweep circuit generator 48 being applied to deflection plates 51 and 52, controlling the horizontal deflection of the beam. At the same time, the difference between the potentials on condensers 31 and 32 is continuously being taken in a difference circuit 53 and this difference between said potentials is applied to the vertically-deflecting plates 54 of cathode ray tube 49. Likewise the difference between the potentials of condensers 33 and 34 is being taken in a difference circuit 55 and this difference voltage is applied to the vertically-deflecting plates 56 of cathode ray tube 50.

Considering first the voltage ratio indicator system 29 and assuming that $V_1$ is greater than $V_2$, condenser 31 is charged to voltage $V_1$ and condenser 32 is charged to voltage $V_2$. In the present example of the invention, condenser 31 discharges more rapidly than condenser 32, and consequently there is a very distinct crossover point at which the instantaneous voltage ($e_1$) across condenser 31 is equal to that ($e_2$) across condenser 32 as the higher voltage across condenser 31 is falling more rapidly. This point is designated as S in Fig. 4A. As the discharge voltages $e_1$ and $e_2$ of condensers 31 and 32, respectively, rapidly approach equality, a trace 57 is produced on the face 58 of the screen which crosses the calibrated midline 59 at the point where the two voltages are equal. This midline may be suitably calibrated in terms of ratios or whatever system of notation is desired which varies according to said ratio and a reading is taken where the trace 57 crosses line 59.

Considering system 30 in which condenser 33 discharges more rapidly than condenser 34, in this case the higher voltage $V_1$ charges condenser 34 while the lower voltage $V_2$ charges condenser 33. The higher voltage which we shall designate as $e_{34}$, the voltage across condenser 34, varies instantaneously as shown in Fig. 4B and declines more slowly than the lower voltage $e_{33}$. The result of this is that the difference between these two voltages remains great for a substantial period of time, and the difference voltage applied to plates 56 might produce a trace like 60 which never crosses the midline 59 of the face 61 of cathode ray tube 50. Suitable amplifiers 61 and 61A may be used to increase the slope of the traces and the sharpness of the crossover.

It will be quite evident that if instead of $V_1$ being greater than $V_2$, $V_2$ were greater than $V_1$, a trace crossing the midline similar to trace 57 would appear on the face 62 of cathode ray tube 50.

The calibration of the midlines 59 and 59' might be made directly in terms of direction, temperature, distance or whatever the voltage ratio basically represents, and thus a direct reading of any of such quantity might be made from the appropriate one of the two cathode ray tubes. It will be obvious that many changes could be made in the arrangement of Fig. 2, such as, for example, using a single tube with switching and/or a double trace or a double beam tube. Other means for timing the period between the initiation of discharge and the time the voltages reach the crossover or equality point might be employed. Likewise, it is apparent that other charging and discharging circuits for the capacitors might be used.

In the case where voltages $V_1$ and $V_2$ are pulses, then the sampling arrangement utilizing gating pulse generator 47 is unnecessary and the tubes 35—38 may become conductive upon receipt of the pulses to charge their respective condensers to a voltage proportional to the magnitude of the pulses.

Figure 3:
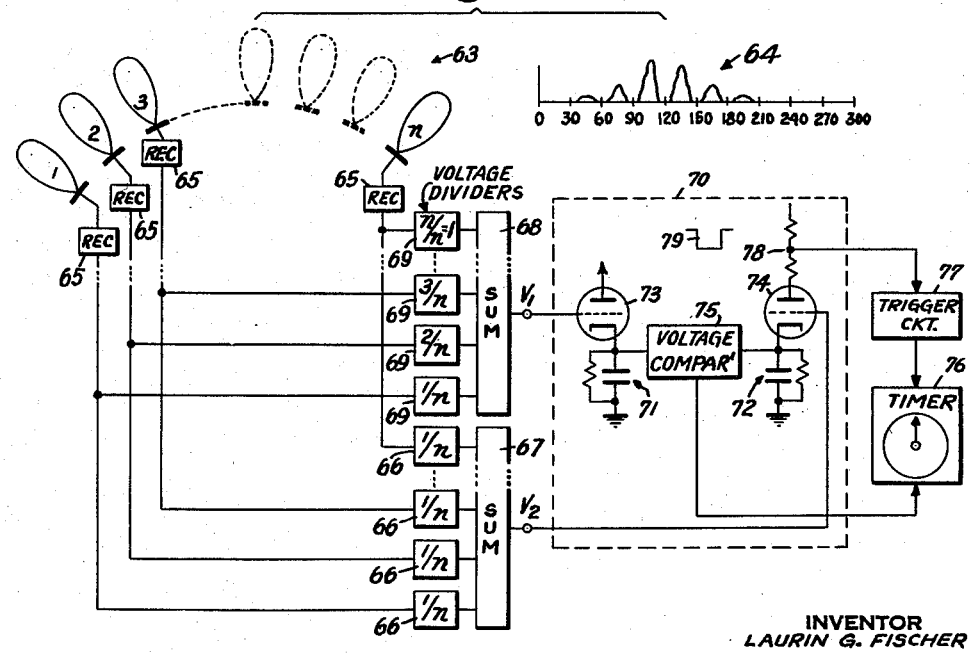
Fig. 3 is a schematic and block diagram of a direction finder arranged in accordance with another aspect of the present invention to give an instantaneous indication of the azimuth of a signal source.

As has been stated before, a continuous indication of azimuth may be obtained in a direction finding system in accordance with the present invention. This system is shown schematically in Fig. 3. In said system an array 63 of a multiplicity of antennas is shown consisting of $n$ antennas whose directive patterns cover a predetermined arc of the azimuth or the entire azimuth so that depending upon the direction from which a signal is received, several of the antennas simultaneously are energized to different magnitudes as is, for example, shown in curve 64 forming part of Fig. 3. Assuming such signals are in the form of a pulsed radio frequency, the signal from each of the antennas, 1, 2, 3 ... $n$ of the array 63 is detected in a suitable receiver 65 so as to produce a video pulse output. A given portion of each of the video voltages is obtained as, for example, from voltage dividers 66 which each divide the input video pulse by a factor $$\frac{k}{n}$$

in which, for example, $k$ may be one, the output of these dividers then being added together in a summing circuit 67 to produce an output voltage which we shall designate as $V_2$. A second sum voltage $V_1$ is obtained from a summing or adding circuit 68 which adds together the voltages produced when video pulses from each of the antennas is suitably proportioned with a weighting factor depending upon the position of the antenna in the array. Thus, with respect to the output video pulse from antennas 1, 2, 3 ... $n$, respectively, $$\frac{1}{n}$$

is taken of antenna 1, $$\frac{2}{n}$$

of antenna 2, $$\frac{3}{n}$$

of antenna 3 ... and $$\frac{n}{n}$$

of antenna $n$, in suitable voltage dividers 69. These voltages are then added in summing circuit 68 to produce voltage $V_1$. Since obviously $V_1$ will always be greater than $V_2$, a simple ratio device 70 in accordance with the present invention may be employed.

This ratio device 70 may include two RC circuits 71 and 72 of which RC circuit 71 discharges more rapidly and is charged under the control voltage $V_1$ through any suitable means, such as through the cathode circuit of associated tube 73 while the RC circuit 72 is charged through the cathode circuit of the cathode ray tube 74 under the control of voltage $V_2$. A suitable voltage comparator 75 compares the instantaneous voltages across the capacitor of circuits 71 and 72 and when they are equal, halts a time controlled indicator 76 whose timing is started by a trigger circuit 77 which is tripped when tube 74 ceases to conduct. For this purpose, the trigger circuit 77 may be connected to a point on the anode resistor 78 of tube 74. When a pulse is applied to the grid of tube 74, this point will go negative, and at the termination of said pulse will go positive again, producing a pulse such as, for example, negative pulse 79. The trailing edge of said pulse may be used to operate the trigger circuit, and for separating this trailing edge a suitable differentiating circuit, together with a rectifier, may be employed. The trailing edge then actuates trigger circuit 77. Other similar arrangements would readily occur to those versed in the art. The indicator 76 will preferably be calibrated in terms of azimuth.

As an example of the operation of the above system, take ten antennas covering 300° of azimuth or 30° each, whose center lines are placed at 15°, 45°, 75°, 105°, 135°, 165°, 195°, 225°, 255°, and 285°. Assume that a signal is arriving at 120°, which would induce signals at each output of relative amplitudes: 0, 10, 30, 70, 70, 30, 10, 0, 0, 0. (See curves 64 of Fig. 3.)

Let $n=10$, then $$V_2 = 0+1+3+7+7+3+1+0+0+0 = 22$$

and $V_1 = 0+2+9+28+35+18+7+0+0+0 = 99$ then $$\frac{V_1}{V_2} = \frac{99}{22} = 4\tfrac{1}{2}$$

which places the centroid halfway between the fourth (105°) and fifth (135°) antennas, or 120°.

In this manner any desired number of abscissa or ordinate samples may be taken, and the centroid of the figure (azimuth in the D.F. case) may be determined. The ratio $$\frac{V_1}{V_2}$$

is obtained in the manner detailed above. Note that $V_1$ is always greater than $V_2$ in this application, hence, one is assured of a zero crossing.

It may also be noted that an interpolation is made between the major directive axes of the different antennas so as to give a continuous azimuth indication and a correspondingly accurate one when the equipment is properly designed.

While the indicator 76 may be a cathode ray tube, other timing devices may be used as, for example, marks made on a tape, magnetic or optical, for future analysis, or some form of clock mechanism which will stop and start timing controls, or any one of a large number of other suitable timing devices. These devices may be suitably calibrated, for example, in terms of distance or degrees.

In connection with the specific circuitry herein described, it was assumed that the voltages whose ratio is to be taken are positive with respect to ground. Even if these voltages are negative with respect to ground, no difficulty will be encountered and appropriate changes, where necessary, will become apparent to those versed in the art.

While I have described my invention above with reference to specific embodiments, it is to be understood that the invention is to be interpreted according to the state of the prior art and the appended claims.

I claim:

1. A direction finding system comprising an array of differently-directed directive antennas, means associated with each of the antennas of the array for producing an output proportional to the energy received, a first adding device coupled to the outputs of said aforementioned means for producing a first sum voltage, means coupled to the outputs of each of said antennas for producing an output voltage proportional to the energy received thereon multiplied by a factor corresponding to the sequential position of the directive pattern of the corresponding antenna in the array, a second adding circuit coupled to the outputs of said last-mentioned means for producing a second sum voltage, and means coupled to the outputs of said first and second adding circuits for comparing said first and second sum voltages and indicating the ratio thereof, said ratio corresponding to the direction from which the energy is received with respect to said array.

2. A direction finding system comprising an array of differently-directed directive antennas, means associated with each of the antennas of the array for producing an output proportional to the energy received, a first adding device coupled to the outputs of said aforementioned means for producing a first sum voltage, means coupled to the outputs of each of said antennas for producing an output voltage proportional to the energy received thereon multiplied by a factor corresponding to the sequential position of the directive pattern of the corresponding antenna in the array, a second adding circuit coupled to the outputs of said last-mentioned means for producing a second sum voltage, a pair of capacitors, means for applying the output of said first adding circuit to one of said capacitors and the output of said second adding circuit to the other of said capacitors to charge said capacitors to potentials proportional to the magnitude of the outputs of said adding circuits, a discharge circuit for each of said capacitors, the time constant of the discharge circuit of the capacitor associated with the first adding circuit being greater than the time constant of the other discharge circuit, and timing means for measuring the elapsed time between the beginning of the discharge of said capacitors and the moment when the potential on said capacitors reaches a predetermined relationship.

References Cited in the file of this patent

UNITED STATES PATENTS

| | | |
|---|---|---|
| 2,647,236 | Saunderson et al. | July 28, 1953 |
| 2,763,838 | McConnell | Sept. 18, 1956 |